US009335814B2

(12) United States Patent
Rusu et al.

(10) Patent No.: US 9,335,814 B2
(45) Date of Patent: May 10, 2016

(54) ADAPTIVELY CONTROLLING LOW POWER MODE OPERATION FOR A CACHE MEMORY

(71) Applicant: Intel Corporation, Santa Clara, CA (US)

(72) Inventors: Stefan Rusu, Santa Clara, CA (US); Min Huang, Cupertino, CA (US); Wei Chen, Sunnyvale, CA (US); Krishnakanth V. Sistla, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 286 days.

(21) Appl. No.: 14/012,362

(22) Filed: Aug. 28, 2013

(65) Prior Publication Data
US 2015/0067361 A1    Mar. 5, 2015

(51) Int. Cl.
*G06F 1/32* (2006.01)
*G06F 1/00* (2006.01)
*G06F 13/00* (2006.01)

(52) U.S. Cl.
CPC ...... *G06F 1/3275* (2013.01); *G06F 2212/1028* (2013.01); *G06F 2212/601* (2013.01)

(58) Field of Classification Search
CPC .................................................. G06F 1/3203
USPC ....................................................... 713/320
See application file for complete search history.

(56) References Cited

U.S. PATENT DOCUMENTS

| 2,753,527 | A | 7/1956 | Adler |
| 5,781,916 | A | 7/1998 | Hardage et al. |
| 5,905,958 | A * | 5/1999 | Houde .......................... 455/437 |
| 6,977,519 | B2 | 12/2005 | Bhavnagarwala et al. |
| 7,657,767 | B2 | 2/2010 | Rusu et al. |
| 7,886,167 | B2 * | 2/2011 | Burton .......................... 713/320 |
| 8,489,906 | B2 * | 7/2013 | Ramaraju et al. ............. 713/323 |
| 8,631,207 | B2 * | 1/2014 | Fang et al. .................... 711/128 |
| 8,977,817 | B2 * | 3/2015 | Biswas et al. ................. 711/129 |
| 2006/0119393 | A1 | 6/2006 | Hua et al. |
| 2006/0206739 | A1 | 9/2006 | Kim et al. |
| 2007/0262754 | A1 | 11/2007 | Burton |
| 2011/0161595 | A1 | 6/2011 | Fang et al. |
| 2013/0111121 | A1 | 5/2013 | Ananthakrishnan |
| 2014/0173207 | A1 * | 6/2014 | Wang et al. ................... 711/122 |

OTHER PUBLICATIONS

European Patent Office, European Office Action mailed Jan. 14, 2015, in European Patent Application No. 14182706.3.

* cited by examiner

*Primary Examiner* — Suresh Suryawanshi
(74) *Attorney, Agent, or Firm* — Trop, Pruner & Hu, P.C.

(57) ABSTRACT

In an embodiment, a processor includes a plurality of cores each to independently execute instructions, a cache memory including a plurality of portions distributed across a die of the processor, a plurality of sleep circuits each coupled to one of the portions of the cache memory, and at least one sleep control logic coupled to the cache memory portions to dynamically determine a sleep setting independently for each of the sleep circuits and to enable the corresponding sleep circuit to maintain the corresponding cache memory portion at a retention voltage. Other embodiments are described and claimed.

18 Claims, 10 Drawing Sheets

ADAPTIVELY CONTROLLING LOW POWER MODE OPERATION FOR A CACHE MEMORY

TECHNICAL FIELD

Embodiments relate to power management of a system, and more particularly to power management for a cache memory of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

A cache memory as may be used in a processor or otherwise within a system achieves leakage power reduction by putting un-accessed portions of the cache memory in a low power or sleep state by reducing a local voltage in a retention mode. This is accomplished by a series of switches inserted between the portion of the cache memory itself and a power supply. The number of switches that are turned on is modulated to achieve the desired voltage droop. The sleep setting of these switches is a function of the process, temperature and operating voltage. At high operating voltages, the sleep voltage droop may be higher than at lower operating voltages, while at even lower operating voltages (close to a retention voltage) the sleep function is disabled altogether, as the local voltage supply cannot drop below the retention voltage value.

DETAILED DESCRIPTION

Embodiments may dynamically and independently determine an optimal sleep setting for a plurality of sleep circuits each associated with a corresponding cache memory portion, such as distributed portions of a shared cache memory of a multicore processor. More specifically, an optimal sleep setting may be calculated for each individual cache portion (e.g., cache slice) and driven to the respective portions. At a high level, the technique includes calculation of local process, voltage and temperature conditions for each cache slice, and then use of these conditions to calculate sleep settings independently and dynamically for each sleep circuit that maximizes the leakage savings for each slice.

Figure 1:
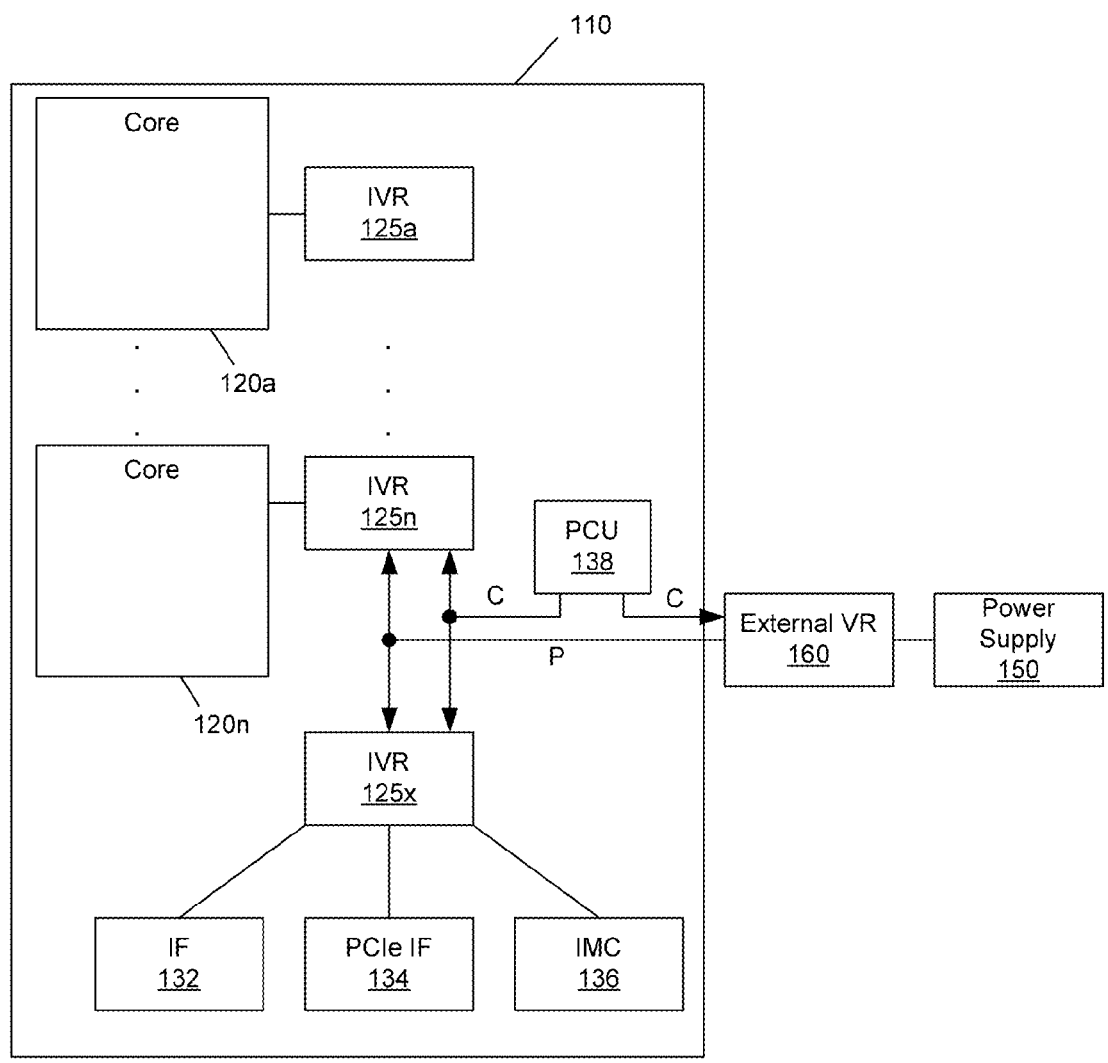
FIG. 1 is a block diagram of a system in accordance with one embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include logic to dynamically and independently calculate and control sleep settings for sleep circuitry associated with different cache memory portions.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the dynamic and independent cache memory low power calculations and control described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

To be able to enter into a sleep state for a cache memory, a supply voltage provided to the cache memory is in excess of a sleep threshold voltage: if the supply voltage exceeds this threshold, the sleep function is enabled and if it is below this voltage, a sleep function is disabled. Note that the sleep setting is a strong function of temperature, since the sleep voltage droop across a sleep circuit is determined by the total leakage of the cache memory and the resistance of the sleep circuit as enabled. Finally, the sleep setting varies from die to die (and as described below across a die), depending on process corner within-die variations.

In large server processors, shared cache memory sub-arrays or slices are distributed all over the die, with a portion of the cache associated with each processor core. Since the die area is relatively large, it is difficult to determine a sleep setting that is optimal for all cache slices on the die. For example, one corner of the die can have a faster process than the opposite corner, due to within-die variations. Further, temperature can vary by 20-30° Celsius across the die, which impacts the voltage droop for the sleep function. The cache voltage can also change under normal operation, which compels an adjustment in the sleep settings. Therefore, having a conventional single fuse-based static sleep setting does not maximize power savings.

Thus embodiments realize an adaptive sleep mode in which sleep settings are calculated by a control logic such as a power controller of the processor. These sleep settings are independently and dynamically calculated for each cache slice to compensate for process, voltage and temperature variations across the die, enabling each cache slice to enter into sleep states closer to the retention voltage for that particular slice and therefore save leakage power.

In an embodiment the power controller dynamically calculates a local operating voltage (supply voltage minus the droop across a corresponding sleep circuit) and sleep strength setting for each cache slice. In many embodiments, setting the granularity to a slice basis is a good trade-off to account for process, voltage and temperature variations across the die. Of course in other embodiments, smaller granularity (like groups of sub-arrays within each slice) calculations and independent control may be realized.

The retention voltage and the actual operating voltage may be used to determine if the sleep function is to be enabled for a given cache portion. In an embodiment, the PCU determines the retention voltage for each cache slice using the local process, voltage and temperature for each cache slice.

Figure 2:
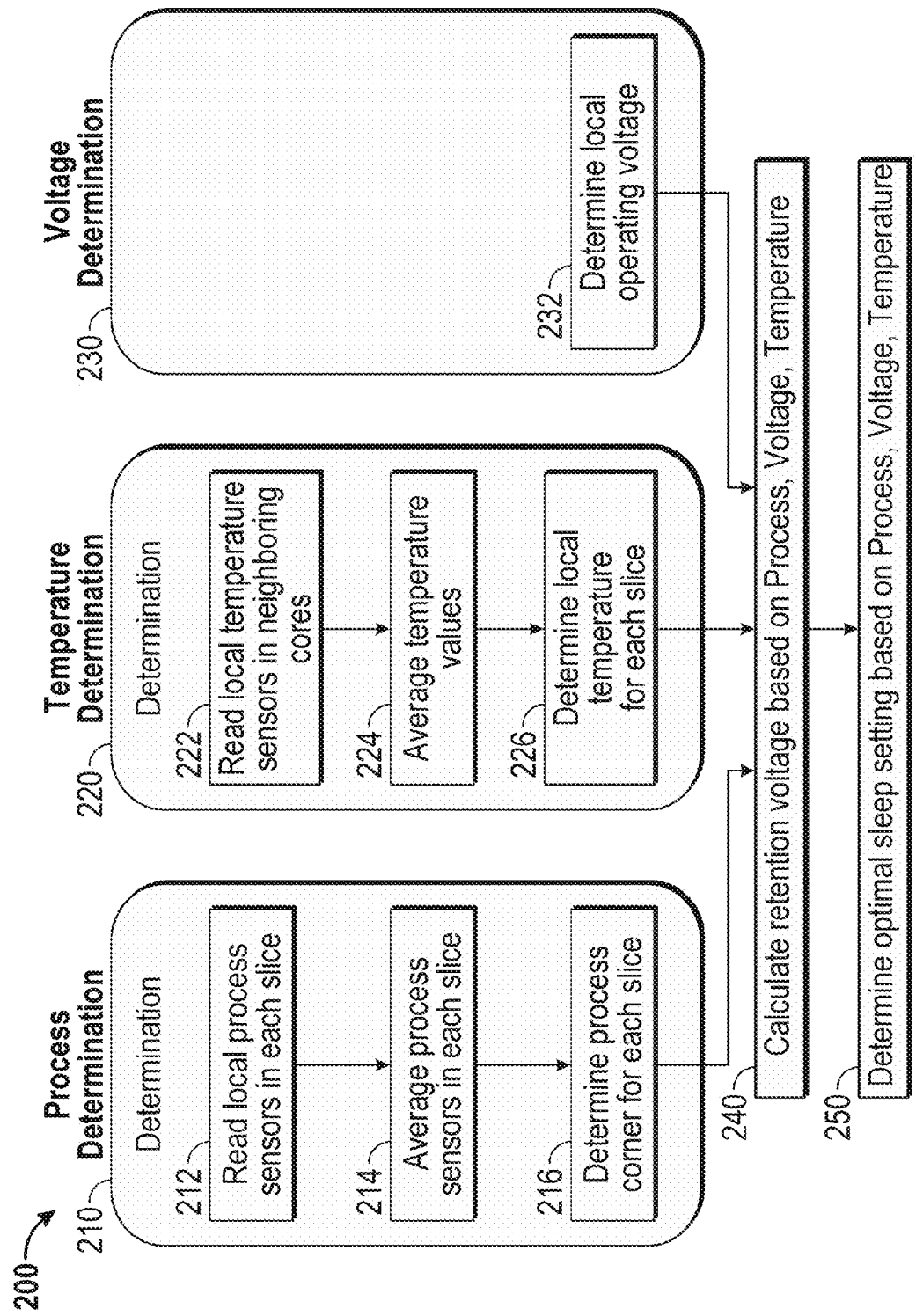
FIG. 2 is a flow diagram of a high level view of a method for performing calculations for controlling power consumption of a cache portion in accordance with an embodiment of the present invention.

Referring now to FIG. 2, shown is a flow diagram of a high level view of a method for performing calculations for controlling power consumption of a cache portion in accordance with an embodiment of the present invention. As shown in FIG. 2, method 200 may be performed by a power controller of a processor such as a PCU or other control logic. For example, in other embodiments, rather than a central power controller of a processor, programmable logic such as a finite state machine may be replicated in multiple locations (such as within each core, cache memory or other agent) to allow a multicore processor to perform the method of FIG. 2 in a distributed manner.

As shown in FIG. 2, method 200 may be used to dynamically determine a retention voltage and sleep settings for a corresponding sleep circuit for a given portion of a cache memory such as a shared cache memory. For example, in an embodiment method 200 may be performed for each slice of a shared cache memory. Of course, different granularities are possible and the control method may be performed on a sub-slice basis such as for a given sub-array of the slice (or on a coarser granularity such as for multiple slices). Furthermore, while a distributed cache memory having a slice-based configuration is described herein for example purposes, understand that a distributed cache memory may have different portions distributed across a die in a variety of different manners.

In general, method 200 may be used to determine a retention voltage for each cache portion using local process, voltage and temperature (P,V,T) for each cache portion. First, a process determination 210, a temperature determination 220, and a voltage determination 230 may occur. Note that these determinations may be made in any order and can be made at different time intervals. For example, process determination 210 may be calculated for each cache slice to enable determination of variations across die once at power on and its corresponding determined value stored for later usage. Temperature determination 220 and voltage determination 230 may be performed periodically.

For process determination 210, which may be performed on power on of a system including a processor, each of multiple test (e.g., process) sensors associated with a slice may be read (block 212). For example, a given cache slice may include multiple ring oscillators located at various positions throughout the slice. As an example, each slice may include between approximately 25 and 50 ring oscillators. When enabled during process determination 210, each of these ring oscillators may operate, generating a clock signal at a given frequency. These corresponding clock signal frequencies are input into a counter and its output may then be provided, e.g., via a serial bus to the PCU. Next, at block 214 the process sensors may be averaged depending on their physical location with respect to each cache slice. Understand that in other embodiments, instead of a ring oscillator another type of process sensor such as a critical path replica may be used.

Next, based on the average frequency determined for the given slice, a process corner for the slice may be determined (block 216). As an example, a lookup table may be present in the PCU that includes a plurality of entries each associating a corresponding operating frequency with a given process corner. For example, if the operating frequency (as determined in block 214) is higher than a predetermined value, the process corner may be considered to be of a fast process corner and correspondingly, if the operating frequency for a given slice is less than a certain value, the cache slice may be considered to be of a slow process corner. Although not shown for ease of illustration, understand that the determined process corner value may be stored in an appropriate storage such as a table storage in a memory of or associated with PCU. This process corner memory may include a plurality of entries each associated with a given cache slice and each identifying a process corner value for the corresponding cache slice (e.g., fast process corner, typical process corner, slow process corner, or intermediate points in between). Note that process determination 210 may be performed for every cache slice, e.g., on power up. Of course in other embodiments, the process corner determination may take place at other times as appropriate.

Still referring to FIG. 2, temperature determination 220 may be performed on a more regular interval, e.g., every 1 millisecond (ms). To enable determination of variations across die, temperature determination 220 may be performed for each cache slice. First, at block 222 local temperature sensors may be read in neighboring cores. That is, in an example embodiment temperature sensors may be located in cores associated with slices, rather than within the cache slices themselves. Of course in another implementation, one or more local temperature sensors may be present within the cache slices themselves. In any event, these local temperature sensors are read and at block 224 the values are used to generate an average temperature value. Note that this average temperature value may take into account different weightings for the temperature values based on proximity of a given core to the corresponding slice. From this average, at block 226 a local temperature may be determined. As above with the process determination the temperature determination may be made for each cache slice. And as with the process corner determination the local thermal values may be stored in a storage, e.g., a table storage implemented as a thermal memory including a plurality of entries each associated with a given cache slice and each identifying a temperature value for the corresponding cache slice.

Still referring to FIG. 2, voltage determination 230 also may be performed. In an embodiment, voltage determination 230 may be performed each time an operating voltage changes for a given cache slice. In general, voltage determination 230 may be performed by determining a local operating voltage. This determination may be made, e.g., based on the PCU's knowledge of the operating voltage it instructed for a given slice. Alternately, a local voltage sensor circuit can be used and a digital voltage output is transmitted to the PCU. Accordingly, at this point process, temperature and voltage information is available for each cache slice.

Next, a retention voltage may be calculated for each cache slice based on this process, voltage and temperature information (block 240). Furthermore, an optimal sleep setting for a sleep circuit associated with each cache slice may be determined at block 250. Here, an optimal sleep strength is calculated using the same process, temperature and voltage values calculated before. In one embodiment, there are 16 sleep settings (via a 4-bit control signal) that can be used to control an operating voltage provided to the corresponding cache portion.

Note that the retention voltage determination and sleep setting determination may be performed in an iterative manner until the optimal sleep setting value is obtained. Furthermore, understand that the temperature and voltage determinations may continually be updated, e.g., according to a predetermined interval (e.g., 1 ms) for the temperature determination, and anytime an operating voltage change occurs for the voltage determination. Although shown at this high level in the embodiment of FIG. 2, understand the scope of the present invention is not limited in this regard.

Figure 3:
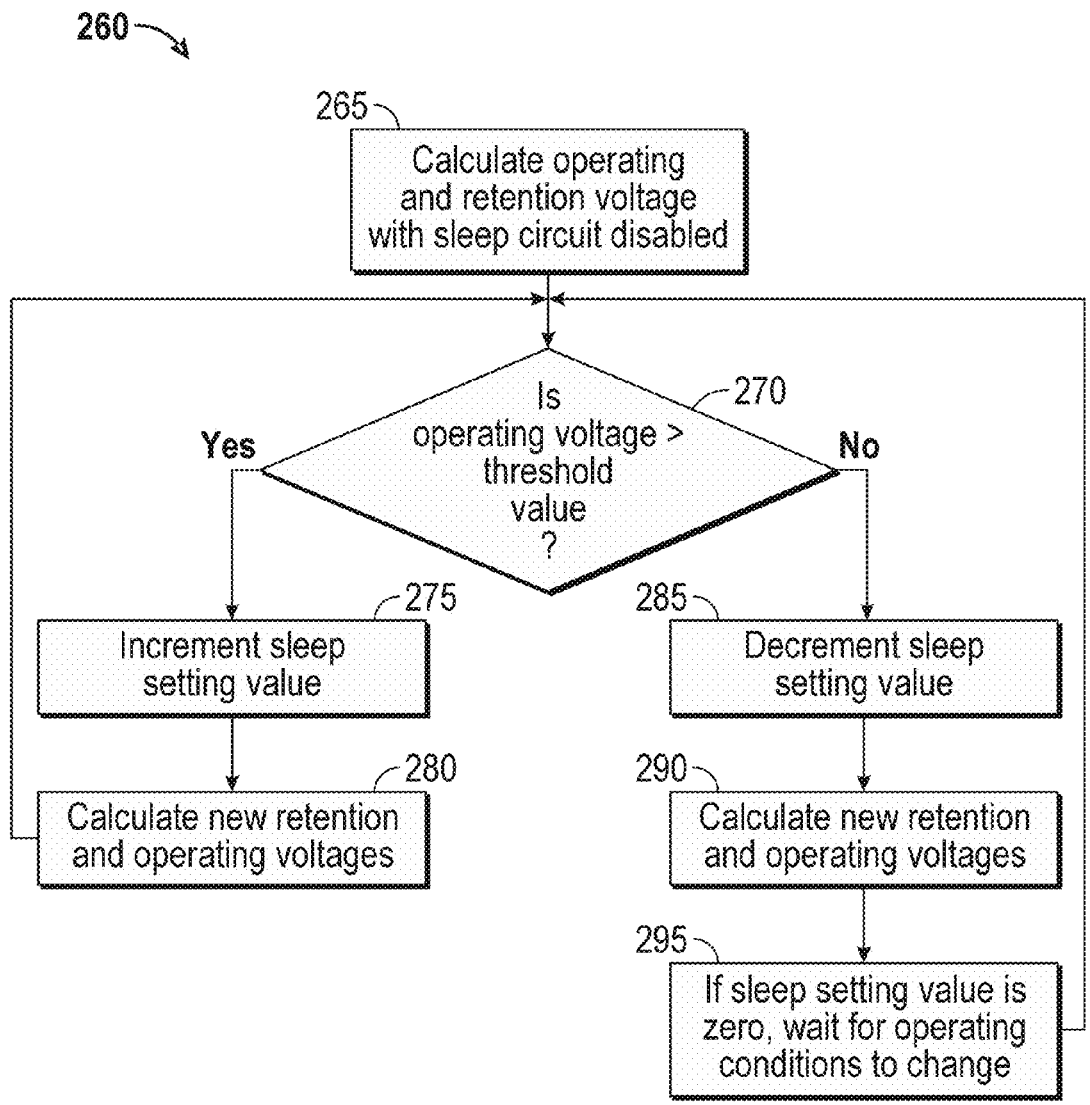
FIG. 3 is a flow diagram of a method for determining an optimal sleep setting in accordance with an embodiment of the present invention.

Referring now to FIG. 3, shown is a flow diagram of a method for determining an optimal sleep setting for a sleep circuit in accordance with an embodiment of the present invention. As shown in FIG. 3, method 260 may similarly be performed by a power controller such as a PCU or other programmable logic, e.g., associated with a given cache portion. Method 260 begins by calculating an operating voltage and retention voltage (block 265). Here the calculation of operating voltage and retention voltage may be performed with the sleep circuit disabled. In general the operating voltage provided to the cache portion may be the same as the operating voltage for the corresponding processor core, e.g., Vcc. The retention voltage is thus initialized with all sleep transistors turned off (no sleep).

Still referring to FIG. 3, at diamond 270 it may be determined whether the operating voltage is greater than a threshold value. In an embodiment, this threshold value may correspond to a retention voltage value and a margin. This threshold value ensures that the operating voltage for the cache slice is high enough to support sleep (note that to accurately retain information stored in the cache memory, the operating voltage exceeds the retention voltage by a programmable margin). As an example, this margin may be between approximately 30 and 50 millivolts, in an embodiment.

If it is determined that the operating voltage is greater than this threshold value, control passes to block 275 where a sleep setting value may be incremented (e.g., by one step). This sleep setting value may be a digital code that is used to control a sleep circuit, details of which are described further below. By implementing this sleep setting, at least a portion of the sleep circuit is enabled to a create a sleep droop in the operating voltage, causing the operating voltage for the cache memory portion to be less than the operating voltage provided to the core/slice. In one embodiment, for a given sleep circuit the PCU starts from the weakest setting and incrementally increases the sleep setting until the actual operating voltage provided to the cache portion (after the effect of the at least partially enabled sleep circuit) is just above the retention voltage (within a programmable margin). The retention voltage is a function of the sleep setting, process, and temperature and may be calculated iteratively for each new sleep setting. Due to this change in sleep setting, a new retention voltage and operating voltage is determined at block 280. Thereafter, control passes back to diamond 270, discussed above. The local operating voltage for a cache slice is the main supply voltage (known to the PCU) minus the voltage droop on the sleep circuit (calculated from a table lookup based on the local PVT data, in an embodiment) and may be in accordance with the following equations:

$$SRAM\_VCC = VCC - SleepTransDroop(SleepStrength, Process, Temp)$$

$$SRAM\_VCC \geq VbaseRetention(Voltage, Process, Temp)$$

where VCC is the supply voltage, SRAM_VCC is the operating voltage of the cache memory portion, SleepTransDroop is the voltage droop across the sleep circuit, and VbaseRetention is the minimum retention voltage (taking into account some margin).

Still referring to FIG. 3, if instead it is determined at diamond 270 that the operating voltage is not greater than the threshold value, control passes to block 285. There, the sleep setting value may be decremented (block 285). With a decremented sleep setting, less of the sleep circuit is enabled and as such, a greater operating voltage applied to the cache slice is realized. And at block 290 a new retention voltage and operating voltage may be determined. Finally, at block 295 if the sleep setting is at its lowest value (a disabled sleep value) a pause state may occur to allow conditions to potentially change. For example, such a change can be a new operating voltage (which is triggered by the PCU) or a large local temperature change (which is monitored by the PCU). Understand that while shown with this high level view in the embodiment of FIG. 3, the scope of the present invention is not limited in this regard.

In another implementation a logic state machine to implement the sleep setting determination may be configured in hardware in each cache slice for processors that do not have a PCU (like many SoC designs). In either event, instead of using a single set of static sleep settings to control all sleep circuits, to reduce cache memory leakage independent adaptive settings are used for each sleep circuit to maximize power savings in the face of increasing PVT variations across the die.

Figure 4:
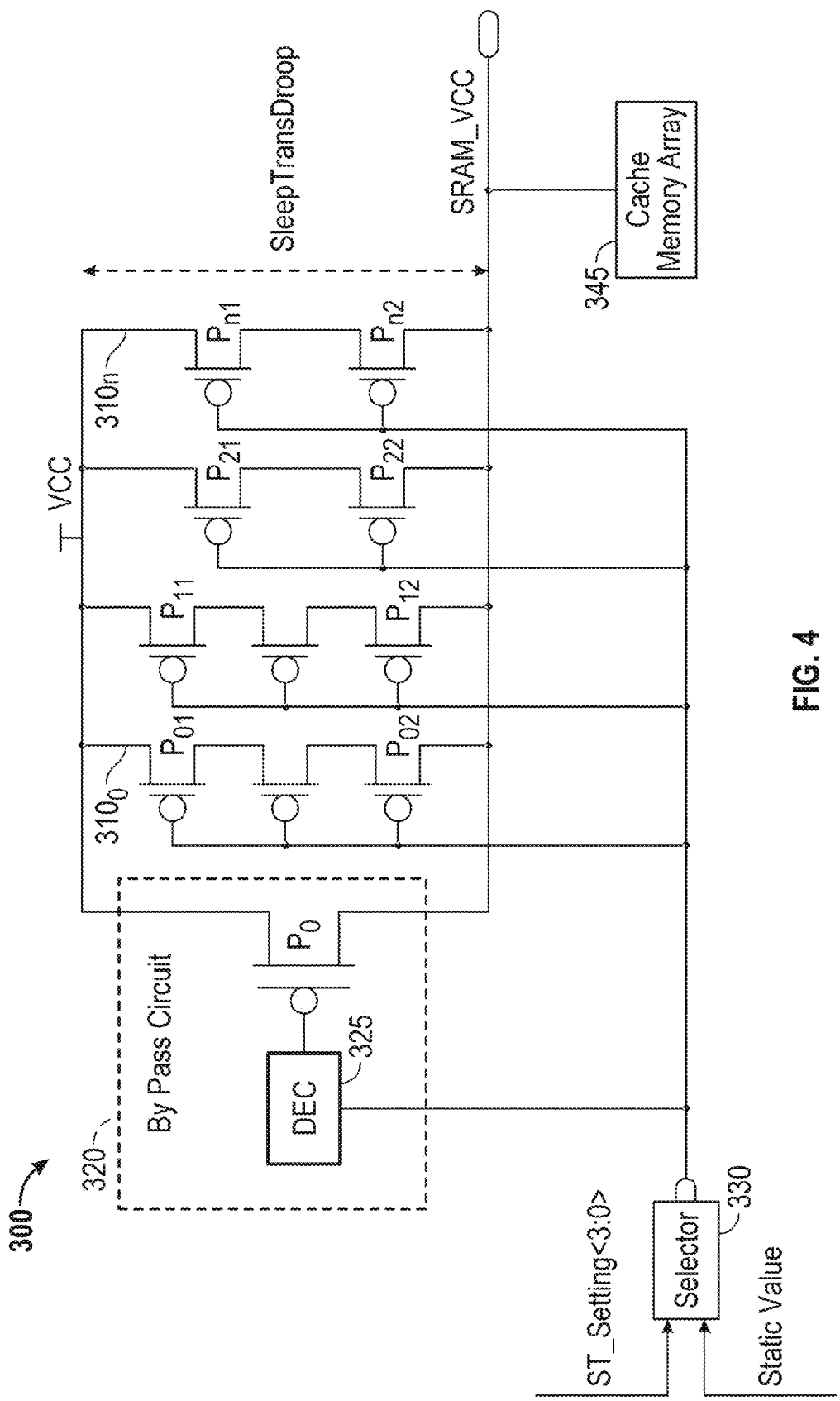
FIG. 4 is a block diagram of a sleep circuit in accordance with an embodiment of the present invention.

In one embodiment, dynamic sleep settings are provided to a sleep circuit such as shown in FIG. 4, which is a block diagram of a sleep circuit in accordance with an embodiment of the present invention. As shown in FIG. 4, circuit 300 is a sleep circuit that includes a plurality of transistor legs $310_0$-$310_n$, each including one or more transistors, e.g., metal oxide semiconductor field effect transistors (MOSFETs). In the embodiment shown leg $310_0$ includes PMOS devices $P_{01}$-$P_{02}$, leg $310_1$ includes PMOS devices $P_1$-$P_{12}$, leg $310_2$ includes PMOS devices $P_{21}$-$P_{22}$ and leg $310_n$ includes PMOS devices $P_{n1}$-$P_{n2}$. A similar scheme may be implemented using NMOS devices. By using different amounts of transistors in each leg, finer granularities of resistance may be provided by way of the sleep circuit. As seen, each of these transistors of the transistor legs are controlled by a control signal output by a multiplexer 330. More specifically, multiplexer 330 receives incoming sleep settings, e.g., in the form of a digital code, namely a four-bit sleep transistor setting (ST_Setting<3:0>). Furthermore, multiplexer 330 receives a static fuse value which may be a single global fixed static value, which is stored into the processor during manufacturing testing based on characterization or in another manufacturing stage. Multiplexer 330 may be controlled, e.g., by the PCU to provide either this static fuse setting or an adaptive sleep setting value, generated e.g., by the PCU or by a logic state machine associated with the cache portion.

Thus based on control of these transistor legs, a sleep transistor droop voltage is effected, thus reducing the supply voltage VCC at a supply voltage node to a lower operating voltage, SRAM_VCC, at a cache operating voltage node, to be provided to a cache memory array 345 which corresponds to a cache slice. In general, when controlled to be in a sleep state, the sleep setting output by multiplexer 330 controls sleep circuit 300 and causes this operating voltage to be at a level at least equal to a retention voltage.

Note further in FIG. 4 the presence of a bypass circuit 320. Bypass circuit 320 includes a decoder 325 coupled to receive the sleep setting output by multiplexer 330. When this sleep setting is of a particular code (e.g., all zeros), indicating that no sleep setting is to be provided, decoder 325 provides a control signal to enable a transistor P0 (which in an embodiment may be a much larger size than the transistors of transistor legs 310) to provide a short circuit between the supply voltage node Vcc and the cache operating voltage node coupled to cache memory array 345, thus providing a fast path to enable the full operating voltage to be provided to the cache memory when the cache memory is active (e.g., performing read and/or write operations). Understand that while shown with the particular implementation in the embodiment of FIG. 4, alternatives are possible.

In an embodiment, the PCU can be coupled via intermediate agents such as repeater stations to a corresponding power management agent within each tile of a multicore processor, where each tile includes one or more cores, a corresponding cache portion and other circuitry associated with the core. Communications may be made by the PCU via a serial bus such that information for a particular tile can be communicated by providing an address for the corresponding power management agent and following that address with message information. For purposes of discussion herein, understand that for each tile the PCU may calculate an appropriate sleep setting dynamically and independently, and via this serial bus communicate the sleep setting as data following an address for a particular power management agent. Once received by the power management agent, the sleep setting is provided to a corresponding sleep circuit, e.g., via an intervening multiplexer such as described above with regard to FIG. 4. In an embodiment, the PCU staggers communication of changes in sleep settings across groups of cores, in order to avoid creating di/dt events.

The power reduction benefits using an embodiment may be realized by the ability to adjust sleep settings independently and adaptively for each cache slice (slowly, but in real time) to track local temperature changes. Embodiments may realize substantial power savings in a multicore processor with a distributed shared cache memory having portions with independently controllable operating voltages as described herein. Embodiments may implement a PCU-driven adaptive leakage reduction technique that optimally configures sleep circuits associated with each cache slice to maximize the leakage savings for the local process, voltage and temperature conditions.

Figure 5:
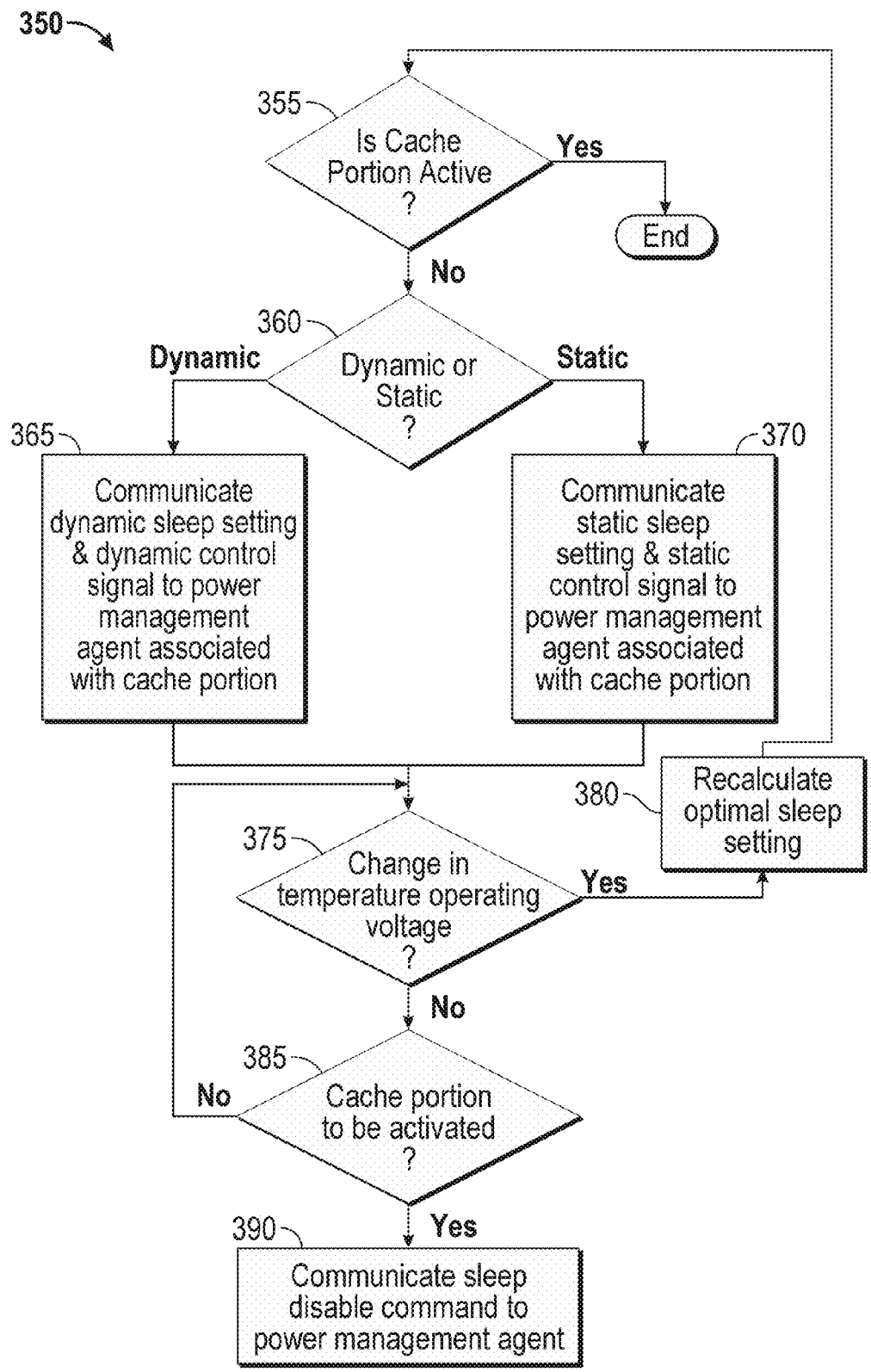
FIG. 5 is a flow diagram of a method for controlling a sleep circuit for a cache portion in accordance with an embodiment.

Referring now to FIG. 5, shown is a flow diagram of a method for controlling a sleep circuit for a cache portion in accordance with an embodiment. In the embodiment of FIG. 5, method 350 may be performed by a PCU for control of a single sleep circuit associated with one cache portion. Understand that this method may be performed for each such sleep circuit associated with the different cache portions. Of course in other embodiments, other logic such as distributed logic or other hardware associated with each cache portion may perform the method.

In FIG. 5, method 350 begins by determining whether a cache portion is active (diamond 355). In an embodiment this determination may be based on whether a read, write or other access to the cache portion has occurred within a predetermined time interval. For example, a timer may be associated with each cache portion to count inactivity duration such that upon expiration of the timer, the cache portion may be considered to be inactive. If the cache portion is active, method 350 concludes as a retention voltage would be insufficient to power the cache memory for active operations. Otherwise, control passes next to diamond 360 where it can be determined whether the sleep circuit is to be controlled dynamically or statically. As described above, a single global static sleep setting may be present, e.g., via a fuse value, in addition to the dynamic setting determined as described herein. This determination of static or dynamic control may be based, e.g., on a setting provided by way of system software, e.g., BIOS, that in turn may be under user control. Of course in other embodiments the static/dynamic determination may be based, e.g., on processor activity or so forth.

If dynamic control is indicated, control passes to block 365 where a dynamically determined optimal sleep setting may be communicated along with a dynamic control signal to a power management agent associated with the cache portion, e.g., to enable control of a multiplexer or other selection circuitry associated with the sleep circuit to provide the dynamic sleep setting to the sleep circuit. Otherwise, at block 370 when static control is indicated, a static optimal sleep setting (e.g., originating from fuses or a static setting determined by the PCU) may be communicated along with a static control signal to the power management agent, e.g., to enable control of a multiplexer or other selection circuitry associated with the sleep circuit to provide the static sleep setting to the sleep circuit.

From both of blocks 365 and 370 control passes to diamond 375 to determine whether a change in temperature or operating voltage has occurred. If so, control passes to block 380 for a recalculation of an optimal sleep setting, as described herein and method 350 may again proceed. If no such change is determined, next it can be determined whether the cache portion is to be activated (diamond 385). This determination may be based upon an indication that cache activity has been requested or is about to occur for the cache portion. If so, control passes to block 390 where a sleep disable command is communicated to the power management agent. This sleep disable command clears the sleep setting provided, causing the full operating voltage to be provided to the cache memory, thus raising the voltage from a retention voltage to a sufficient operating voltage to enable cache access operations to occur. Although described at this high level in the embodiment of FIG. 5, understand the scope of the present invention is not limited in this regard.

Figure 6:
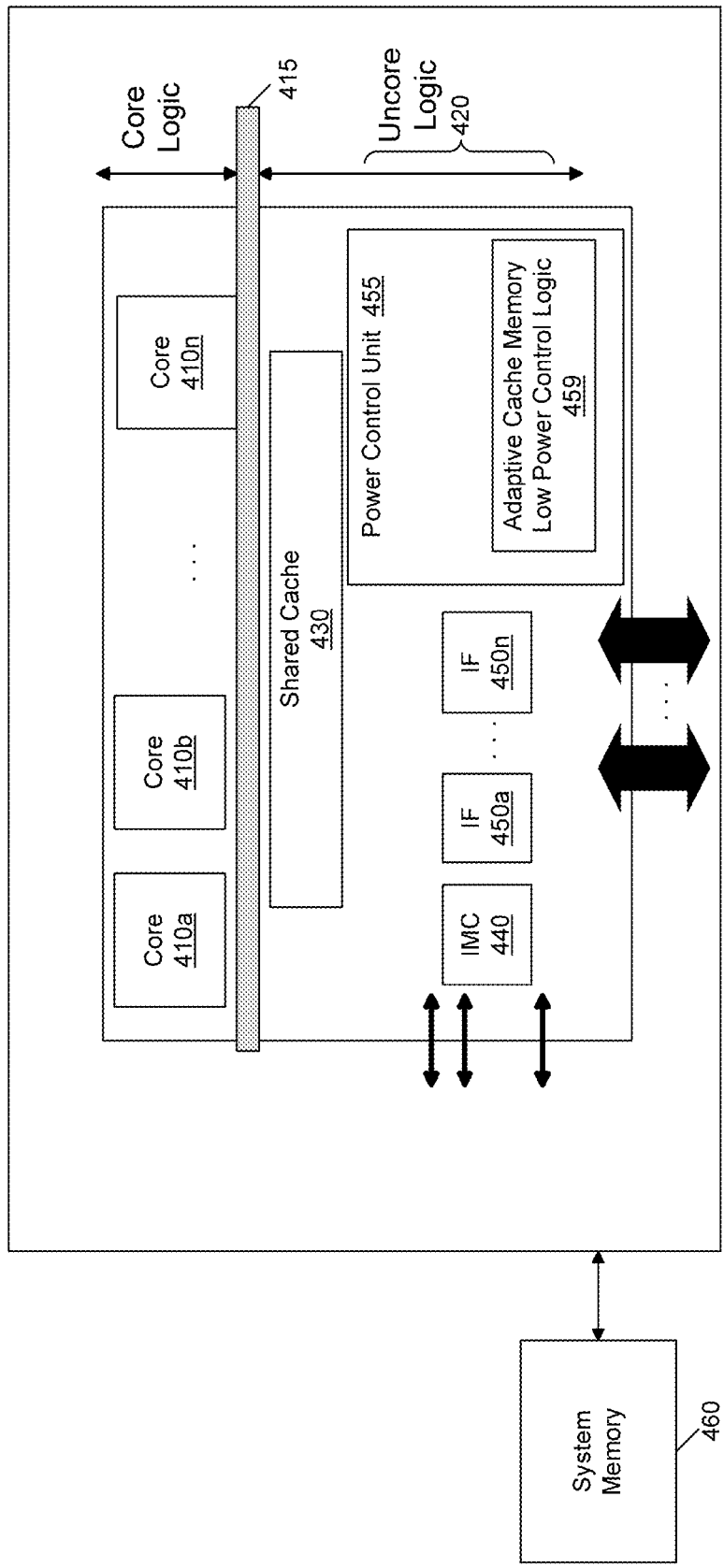
FIG. 6 is a block diagram of a processor in accordance with an embodiment of the present invention.

Embodiments can be implemented in processors for various markets including server processors, desktop processors, mobile processors and so forth. Referring now to FIG. 6, shown is a block diagram of a processor in accordance with an embodiment of the present invention. As shown in FIG. 6, processor 400 may be a multicore processor including a plurality of cores $410_a$-$410_n$. In one embodiment, each such core may be of an independent power domain and can be configured to enter and exit active states and/or maximum performance states based on workload. The various cores may be coupled via an interconnect 415 to a system agent or uncore 420 that includes various components. As seen, the uncore 420 may include a shared cache 430 which may be a last level cache, and which may be distributed so that individual cache slices are located in close proximity to a corresponding core. In addition, the uncore may include an integrated memory controller 440, various interfaces 450 and a power control unit 455. In various embodiments, power control unit 455 may include an adaptive cache memory low power control logic 459 in accordance with an embodiment of the present invention. Using this logic, independent and dynamic optimal sleep settings can be determined and communicated to corresponding sleep circuits each associated with a distributed cache slice portion. In another embodiment, each cache slice may include a local state machine that determines the local process, voltage and temperature and drives the sleep settings for that particular cache slice.

With further reference to FIG. 6, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 6, the scope of the present invention is not limited in this regard.

Figure 7:
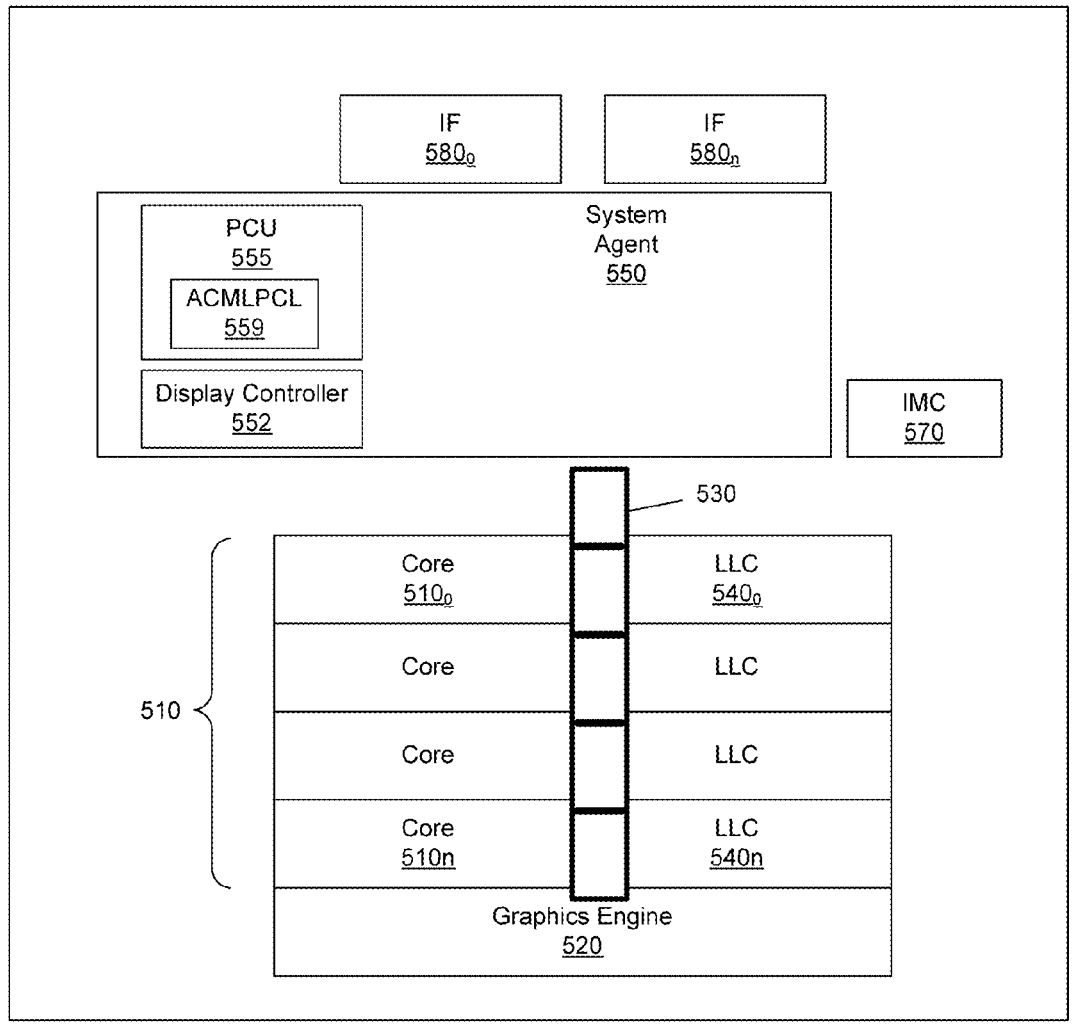
FIG. 7 is a block diagram of a multi-domain processor in accordance with another embodiment of the present invention.

Referring now to FIG. 7, shown is a block diagram of a multi-domain processor in accordance with another embodiment of the present invention. As shown in the embodiment of FIG. 7, processor 500 includes multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include an adaptive cache memory low power control logic 559 in accordance with an embodiment of the present invention to dynamically and independently control sleep circuits associated with cache memory portions with independent optimal settings based at least in part on local process, voltage and temperature conditions. In various embodiments, this logic may execute the algorithms described above in FIGS. 2-3 and 5.

As further seen in FIG. 7, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 7, understand the scope of the present invention is not limited in this regard.

Figure 8:
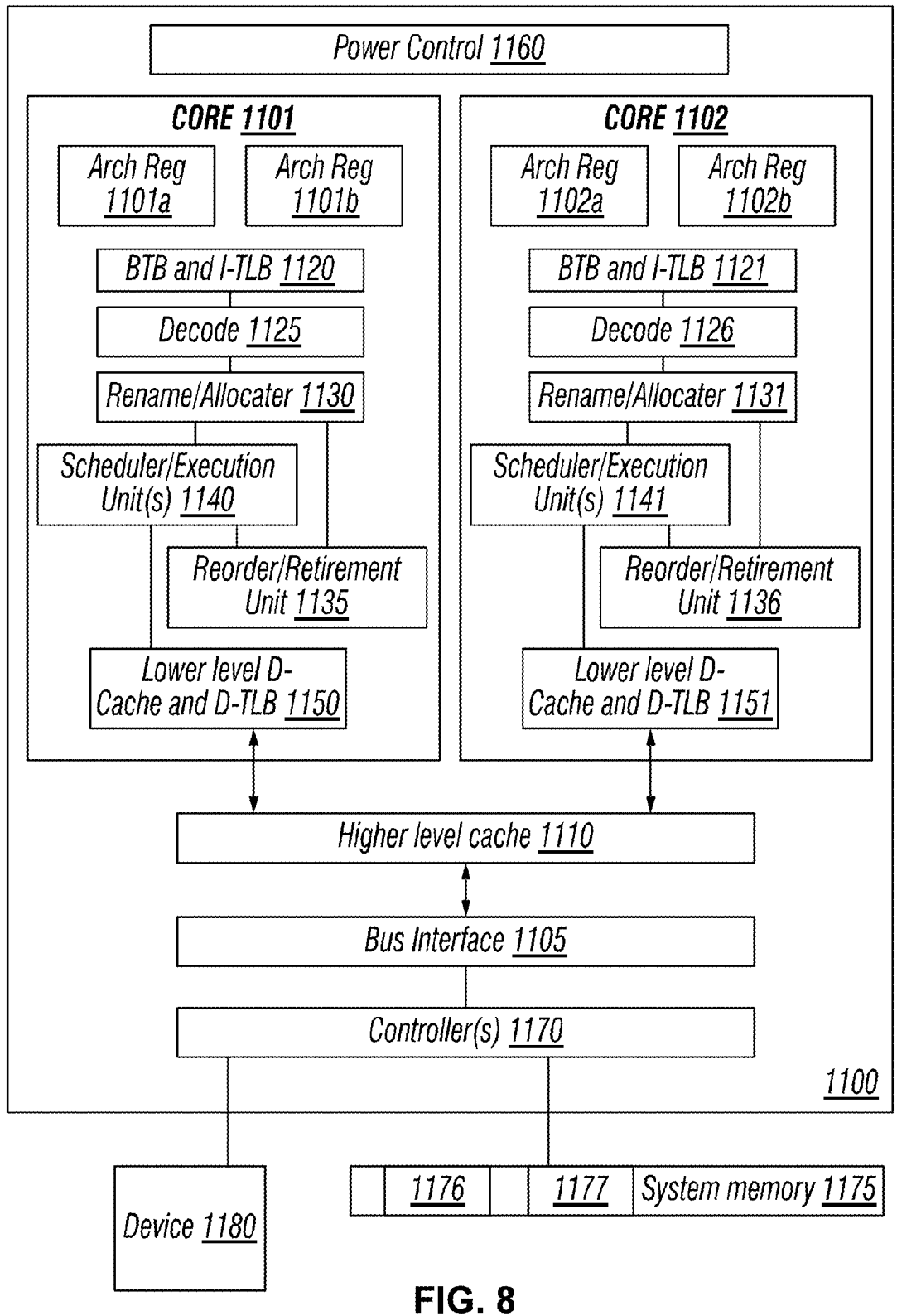
FIG. 8 is a block diagram of a processor including multiple cores in accordance with an embodiment of the present invention.

Referring to FIG. 8, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 8, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101*a* and 1101*b*, which may also be referred to as hardware thread slots 1101*a* and 1101*b*. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101*a*, a second thread is associated with architecture state registers 1101*b*, a third thread may be associated with architecture state registers 1102*a*, and a fourth thread may be associated with architecture state registers 1102*b*. Here, each of the architecture state registers (1101*a*, 1101*b*, 1102*a*, and 1102*b*) may be referred to as processing elements, thread slots, or thread units, as described above. As illustrated, architecture state registers 1101*a* are replicated in architecture state registers 1101*b*, so individual architecture states/contexts are capable of being stored for logical processor 1101*a* and logical processor 1101*b*. In core 1101, other smaller resources, such as instruction pointers and renaming logic in allocator and renamer block 1130 may also be replicated for threads 1101*a* and 1101*b*. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 8, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101*a*, 1101*b*, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 9:
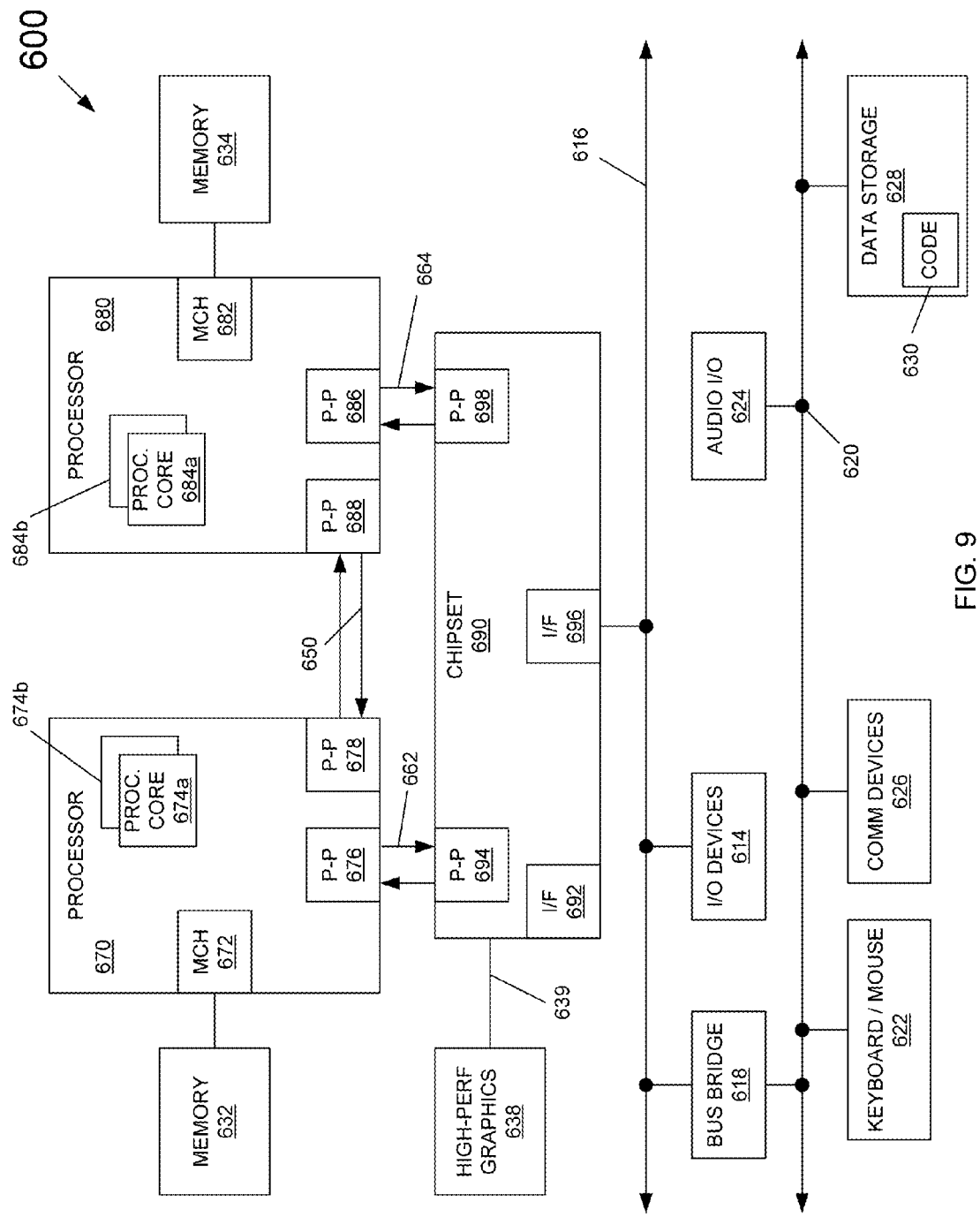
FIG. 9 is a block diagram of a system in accordance with an embodiment of the present invention.

Embodiments may be implemented in many different system types. Referring now to FIG. 9, shown is a block diagram of a system in accordance with an embodiment of the present invention. As shown in FIG. 9, multiprocessor system 600 is a point-to-point interconnect system, and includes a first processor 670 and a second processor 680 coupled via a point-to-point interconnect 650. As shown in FIG. 9, each of processors 670 and 680 may be multicore processors, including first and second processor cores (i.e., processor cores 674a and 674b and processor cores 684a and 684b), although potentially many more cores may be present in the processors. Each of the processors can include a PCU or other logic to independently and dynamically control low power states for a distributed cache memory, as described herein.

Still referring to FIG. 9, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 9, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 8, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 9, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Figure 10:
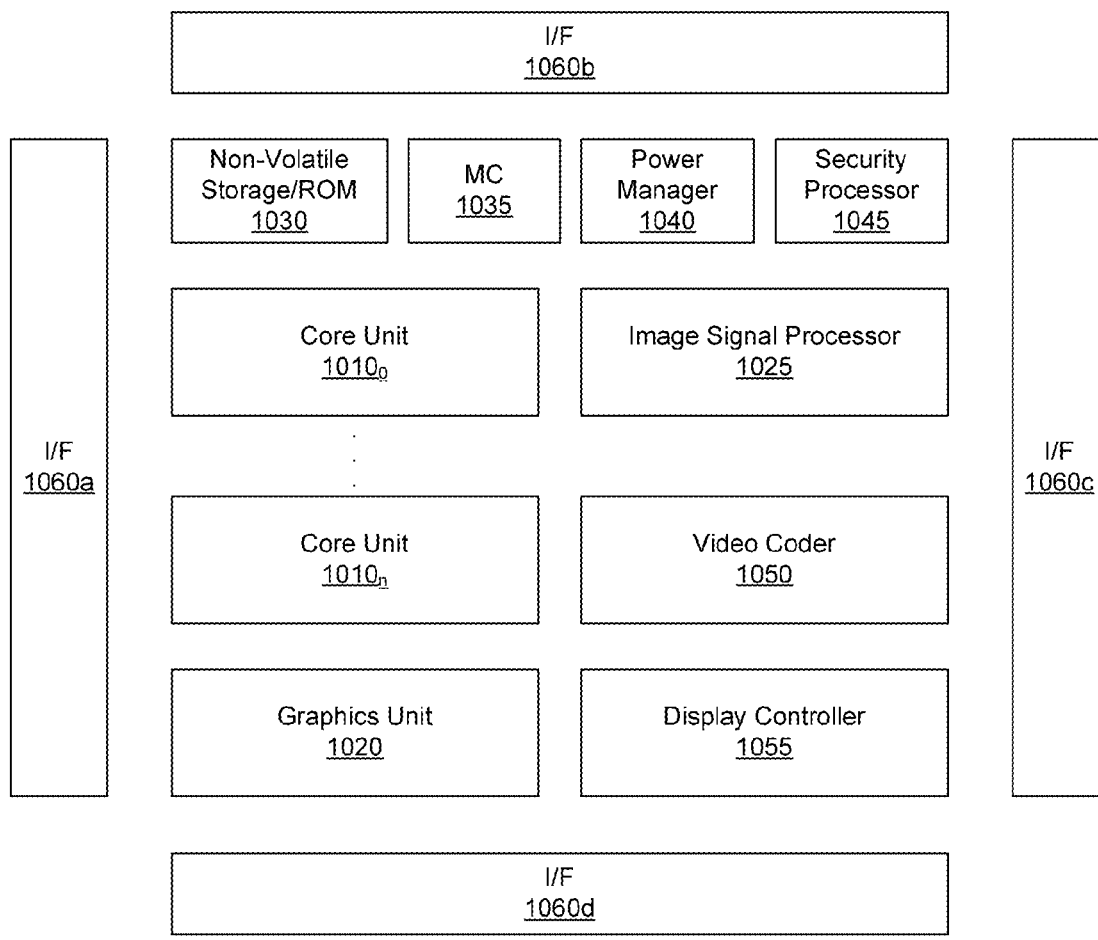
FIG. 10 is a block diagram of a processor in accordance with another embodiment of the present invention.

Referring now to FIG. 10, shown is a block diagram of a processor in accordance with another embodiment of the present invention. In the embodiment of FIG. 10, processor 1000 may be a system on a chip (SoC) including multiple domains, each of which may be controlled to operate at an independent operating voltage and operating frequency. As a specific illustrative example, processor 1000 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or customer thereof or a MIPS-based design from MIPS Technologies, Inc. of Sunnyvale, Calif., or their licensees or adopters may instead be present in other embodiments such as an Apple A5 processor, a Qualcomm Snapdragon processor, or Texas Instruments OMAP processor. Such SoC may be used in a low power system such as a smartphone, tablet computer, Ultrabook™ computer or other portable computing device.

In the high level view shown in FIG. 10, processor 1000 includes a plurality of core units $1010_0$-$1010_n$. Each core unit may include one or more processor cores, one or more cache memories and other circuitry. Each core unit 1010 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.) or other instruction set or combinations thereof. Note that some of the core units may be heterogeneous resources (e.g., of a different design). In addition, each such core may be coupled to a cache memory which in an embodiment may be a shared level (L2) cache memory. A non-volatile storage 1030 may be used to store various program and other data. For example, this storage may be used to store at least portions of microcode, boot information such as a BIOS, other system software or so forth.

Each core unit 1010 may also include an interface such as a bus interface unit to enable interconnection to additional circuitry of the processor. In an embodiment, each core unit 1010 couples to a coherent fabric that may act as a primary cache coherent on-die interconnect that in turn couples to a memory controller 1035. In turn, memory controller 1035 controls communications with a memory such as a dynamic random access memory (DRAM) (not shown for ease of illustration in FIG. 10).

In addition to core units, additional processing engines are present within the processor, including at least one graphics unit 1020 which may include one or more graphics processing units (GPUs) to perform graphics processing as well as to possibly execute general purpose operations on the graphics processor (so-called GPGPU operation). In addition, at least one image signal processor 1025 may be present. Signal processor 1025 may be configured to process incoming image data received from one or more capture devices, either internal to the SoC or off-chip. Other accelerators also may be present. In the illustration of FIG. 10, a video coder 1050 may perform coding operations including encoding and decoding for video information, e.g., providing hardware acceleration support for high definition video content. A display controller 1055 further may be provided to accelerate display operations including providing support for internal and external displays of a system. In addition, a security processor 1045 may be present to perform security operations such as secure boot operations, various cryptography operations and so forth.

Each of the units may have its power consumption controlled via a power manager 1040. Power manager 1040 includes control logic to perform the independent and dynamic low power control for a distributed cache memory as described herein.

In some embodiments, SoC 1000 may further include a non-coherent fabric coupled to the coherent fabric to which various peripheral devices may couple. One or more interfaces 1060a-1060d enable communication with one or more off-chip devices. Such communications may be according to a variety of communication protocols such as PCIe™ GPIO, USB, I2C, UART, MIPI, SDIO, DDR, SPI, HDMI, among other types of communication protocols. Although shown at this high level in the embodiment of FIG. 10, understand the scope of the present invention is not limited in this regard.

The following examples pertain to further embodiments.

In one example, a processor for controlling a voltage for a cache memory comprises a plurality of cores each to independently execute instructions, a cache memory including a plurality of portions distributed across a die of the processor, a plurality of sleep circuits each coupled to one of the plurality of portions of the cache memory, and at least one sleep control logic coupled to the plurality of portions of the cache memory to dynamically determine a sleep setting independently for each of the plurality of sleep circuits, where the sleep control logic is to enable the corresponding sleep circuit to maintain the corresponding cache memory portion at a retention voltage.

In an example, the sleep control logic is to dynamically determine the sleep setting based at least in part on a process, voltage, and temperature associated with the corresponding portion of the cache memory.

In an example, the sleep control logic is to dynamically determine the retention voltage for the corresponding portion of the cache memory based at least in part on the sleep setting.

In an example, the processor further comprises a power controller to control power consumption of the processor, where the power controller is to disable a first sleep circuit when a first portion of the cache memory coupled to the first sleep circuit is active.

In an example, the processor further comprises a plurality of process sensors associated with the first portion of the cache memory, where the sleep control logic is to dynamically determine the sleep setting for the first sleep circuit based at least in part on information from the plurality of process sensors.

In an example, the processor further comprises a plurality of thermal sensors associated with the first portion of the cache memory, where the sleep control logic is to dynamically determine the sleep setting for the first sleep circuit based at least in part on information from the plurality of thermal sensors.

In an example, the sleep control logic is to iteratively calculate a retention voltage and an operating voltage for a corresponding portion of the cache memory until an optimal sleep setting is determined.

In an example, the processor further comprises a plurality of sleep control logics each coupled to one of the plurality of portions of the cache memory to dynamically determine the sleep setting independently for the corresponding portion of the cache memory.

Note that the above processor can be implemented using various means.

In an example, the processor comprises a system on a chip (SoC) incorporated in a user equipment touch-enabled device.

In another example, a system comprises a display and a memory, and includes the processor of one or more of the above examples.

In one example, a method for controlling a voltage for a cache memory comprises calculating a retention voltage for a first portion of a cache memory of a processor based at least in part on a temperature and an operating voltage associated with the first portion of the cache memory, where the retention voltage dynamically changes during operation of the processor, determining a sleep setting based on the retention voltage, and controlling a sleep circuit coupled to the first portion of the cache memory using the sleep setting to enable the first portion of the cache memory to be maintained in a low power state at a voltage level above the retention voltage.

In an example, calculating the retention voltage comprises receiving test information from a plurality of test devices associated with the first portion of the cache memory, and determining a process corner for the first portion of the cache memory based on the test information.

In an example, calculating the retention voltage further comprises receiving thermal information from a plurality of thermal sensors associated with a plurality of cores of the processor in proximity to the first portion of the cache memory, and determining a local temperature for the first portion of the cache memory based on the thermal information.

In an example, calculating the retention voltage further comprises dynamically determining the retention voltage using the process corner, the local temperature, and the operating voltage associated with the first portion of the cache memory.

In an example, the method further comprises controlling the sleep circuit to be disabled when the first portion of the cache memory is in an active state.

In an example, the method further comprises calculating the retention voltage for each of a plurality of portions of the cache memory independently, determining a sleep setting for each of the plurality of portions of the cache memory independently, and controlling a corresponding sleep circuit for each of the plurality of portions of the cache memory independently using the corresponding sleep setting.

In an example, the method further comprises iteratively adjusting the sleep setting in a first direction while an operating voltage of the first portion of the cache memory exceeds a threshold voltage.

In an example, the method further comprises determining if the operating voltage of the first portion of the cache memory exceeds the retention voltage by a threshold value, and if so, adjusting the sleep setting in a first direction.

In an example, the method further comprises adjusting the sleep setting in a second direction if the operating voltage is less than a sum of the retention voltage and the threshold value.

In another example, a computer readable medium includes instructions to perform the method of any of the above examples.

In another example, an apparatus comprises means for performing the method of any one of the above examples.

In one example, a system for controlling a cache memory voltage comprises a multicore processor including a plurality of tiles, each tile including a core, a portion of a cache memory, a sleep circuit and an agent to communicate between the tile and a power controller of the multicore processor, where the power controller is to dynamically determine a sleep setting independently for the sleep circuit of each of the tiles and to communicate the independent sleep setting to the agent of each of the tiles, and the agent is to provide the independent sleep setting to the sleep circuit to maintain the corresponding cache memory portion at a retention voltage.

In an example, a first tile of the plurality of tiles is to communicate thermal information and voltage information of the first tile to the power controller, and the power controller is to dynamically determine the independent sleep setting for the first tile based at least in part on a process associated with the corresponding cache memory portion and the thermal information and the voltage information.

In an example, the sleep circuit of each of the plurality of tiles comprises a selector to provide the independent sleep setting or a static setting to a switch circuit of the sleep circuit to enable the sleep circuit to maintain the corresponding cache memory portion at the retention voltage.

In an example, the power controller is to iteratively calculate a retention voltage and an operating voltage for a corresponding portion of the cache memory until an optimal sleep setting is determined.

In an example, the power controller is to adjust the sleep setting in a first direction while the operating voltage exceeds a threshold voltage, determine if the operating voltage exceeds the retention voltage by a threshold value and if so, adjust the sleep setting in the first direction, and adjust the sleep setting in a second direction if the operating voltage is less than a sum of the retention voltage and the threshold value.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a plurality of cores each to independently execute instructions;
   a cache memory including a plurality of portions distributed across a die of the processor;
   a plurality of sleep circuits each coupled to one of the plurality of portions of the cache memory; and
   at least one sleep control logic coupled to the plurality of portions of the cache memory to dynamically determine a sleep setting independently for each of the plurality of sleep circuits based at least in part on a process, voltage, and temperature associated with the corresponding portion of the cache memory and dynamically determine a retention voltage for the corresponding portion of the cache memory based at least in part on the sleep setting, wherein the at least one sleep control logic is to enable the corresponding sleep circuit to maintain the corresponding cache memory portion at the retention voltage.

2. The processor of claim 1, further comprising a power controller to control power consumption of the processor, wherein the power controller is to disable a first sleep circuit when a first portion of the cache memory coupled to the first sleep circuit is active.

3. The processor of claim 2, further comprising a plurality of process sensors associated with the first portion of the cache memory.

4. The processor of claim 3, further comprising a plurality of thermal sensors associated with the first portion of the cache memory.

5. The processor of claim 1, wherein the at least one sleep control logic is to iteratively calculate a retention voltage and an operating voltage for a corresponding portion of the cache memory until an optimal sleep setting is determined.

6. The processor of claim 1, further comprising a plurality of sleep control logics each coupled to one of the plurality of portions of the cache memory to dynamically determine the sleep setting independently for the corresponding portion of the cache memory.

7. A method comprising:
   dynamically calculating a retention voltage for a first portion of a cache memory of a processor based at least in part on a process corner, a temperature and an operating voltage associated with the first portion of the cache memory, wherein the retention voltage dynamically changes during operation of the processor;
   dynamically determining a sleep setting based on the retention voltage; and
   controlling a sleep circuit coupled to the first portion of the cache memory using the sleep setting to enable the first portion of the cache memory to be maintained in a low power state at a voltage level above the retention voltage.

8. The method of claim 7, wherein dynamically calculating the retention voltage comprises:
   receiving test information from a plurality of test devices associated with the first portion of the cache memory; and
   determining the process corner for the first portion of the cache memory based on the test information.

9. The method of claim 8, wherein calculating the retention voltage further comprises:
   receiving thermal information from a plurality of thermal sensors associated with a plurality of cores of the processor in proximity to the first portion of the cache memory; and
   determining a local temperature for the first portion of the cache memory based on the thermal information.

10. The method of claim 7, further comprising controlling the sleep circuit to be disabled when the first portion of the cache memory is in an active state.

11. The method of claim 7, further comprising:
    calculating the retention voltage for each of a plurality of portions of the cache memory independently;
    determining a sleep setting for each of the plurality of portions of the cache memory independently; and
    controlling a corresponding sleep circuit for each of the plurality of portions of the cache memory independently using the corresponding sleep setting.

12. The method of claim 7, further comprising iteratively adjusting the sleep setting in a first direction while an operating voltage of the first portion of the cache memory exceeds a threshold voltage.

13. The method of claim 12, further comprising:
    determining if the operating voltage of the first portion of the cache memory exceeds the retention voltage by a threshold value; and
    if so, adjusting the sleep setting in the first direction.

14. The method of claim 13, further comprising adjusting the sleep setting in a second direction if the operating voltage is less than a sum of the retention voltage and the threshold value.

15. A system comprising:
    a multicore processor including a plurality of tiles, each tile including a core, a portion of a cache memory, a sleep circuit and an agent to communicate between the tile and a power controller of the multicore processor, wherein the power controller is to dynamically determine a sleep setting independently for the sleep circuit of each of the tiles and to communicate the independent sleep setting to the agent of each of the tiles, and the agent is to provide the independent sleep setting to the sleep circuit to maintain the corresponding cache memory portion at a retention voltage, wherein the sleep circuit of each of the plurality of tiles comprises a selector to provide the independent sleep setting or a static setting to a switch circuit of the sleep circuit to enable the sleep circuit to maintain the corresponding cache memory portion at the retention voltage.

16. The system of claim 15, wherein a first tile of the plurality of tiles is to communicate thermal information and voltage information of the first tile to the power controller, and the power controller is to dynamically determine the independent sleep setting for the first tile based at least in part on a process associated with the corresponding cache memory portion and the thermal information and the voltage information.

17. The system of claim 15, wherein the power controller is to iteratively calculate a retention voltage and an operating voltage for a corresponding portion of the cache memory until an optimal sleep setting is determined.

18. The system of claim 17, wherein the power controller is to adjust the sleep setting in a first direction while the operating voltage exceeds a threshold voltage, determine if the operating voltage exceeds the retention voltage by a threshold value and if so, adjust the sleep setting in the first direction, and adjust the sleep setting in a second direction if the operating voltage is less than a sum of the retention voltage and the threshold value.

\* \* \* \* \*